US007162159B2

(12) United States Patent
Oettinger et al.

(10) Patent No.: US 7,162,159 B2
(45) Date of Patent: Jan. 9, 2007

(54) POSITION DEMODULATION THROUGH POLARIZATION OF THE TRANSMITTED BEAM IN AN OPTICAL WIRELESS LINK

(75) Inventors: Eric G. Oettinger, Rochester, MN (US); Robert E. Jansen, Byron, MN (US)

(73) Assignee: Texas Instruments Incorporated, Dallas, TX (US)

( * ) Notice: Subject to any disclaimer, the term of this patent is extended or adjusted under 35 U.S.C. 154(b) by 658 days.

(21) Appl. No.: 10/146,759

(22) Filed: May 16, 2002

(65) Prior Publication Data

US 2003/0215242 A1 Nov. 20, 2003

(51) Int. Cl.
*H04B 10/00* (2006.01)
(52) U.S. Cl. .................. 398/128; 398/124; 398/130
(58) Field of Classification Search ............... 398/118, 398/124, 128, 130, 120
See application file for complete search history.

(56) References Cited

U.S. PATENT DOCUMENTS

| 3,721,965 | A | * | 3/1973 | Morgan-Voyce | ............ | 365/122 |
| 4,054,367 | A | * | 10/1977 | Eschler et al. | ............... | 359/305 |
| 5,347,387 | A | * | 9/1994 | Rice | .......................... | 398/129 |
| 5,530,577 | A | * | 6/1996 | Orino et al. | ................. | 398/129 |
| 5,760,900 | A | * | 6/1998 | Ito et al. | ...................... | 356/338 |

* cited by examiner

*Primary Examiner*—Dzung Tran
(74) *Attorney, Agent, or Firm*—William B Kempler; W. James Brady; Frederick J. Telecky, Jr.

(57) ABSTRACT

A method of eliminating the non-linearities associated with the remote feedback sensor, such as a quad position detector, used in a micro-electro-mechanical (MEM) mirror assembly. The incoming beam transmitted from a remote optical wireless link is first polarized, and then a single detector is employed to detect the polarization for the receiver. The single detector eliminates the non-linearity associated with a quad position detector, since the space between the quad detectors is eliminated.

17 Claims, 1 Drawing Sheet

POSITION DEMODULATION THROUGH POLARIZATION OF THE TRANSMITTED BEAM IN AN OPTICAL WIRELESS LINK

BACKGROUND OF THE INVENTION

1. Field of the Invention

This invention relates generally to optical wireless communication links, and more particularly, to a system and method of polarizing the transmitted beam and detecting the polarization at the receiver in order to measure positioning accuracy.

2. Description of the Prior Art

An optical wireless link system consists of two stations (OWLs): Each of which contains an optical transmitter and an optical receiver. The transmitter is able to change the direction of its transmitted beam by known amounts of angular displacement. The receiver senses the position of the incident beam relative to the local data detector and sends position correction information back to the transmitter. This feedback is used by a servo control loop to position the transmitted beam on the receiver of the remote station.

A typical remote feedback sensor which is distinct from the data detector (for example quad position detectors surrounding the data detector) used in a micro-electro-mechanical (MEM) mirror has inherent non-linearities. These non-linearities adversely affect the mirror movement control system. Such non-linearities change the apparent gain of the control system limiting the tracking performance. Further, there is considerable cost associated with the quad position detectors. The cost of the OWLs must be as low as possible for a mass market device.

In view of the foregoing, it would be both desirable and advantageous in the optical wireless communication art to provide a technique that eliminates the nonlinearities associated with the remote feedback sensor used in an optical wireless link (OWL) unit. It would also be advantageous if the technique could be implemented at substantially less cost than that generally associated with quad position detectors.

SUMMARY OF THE INVENTION

The present invention is directed to a technique that eliminates the non-linearities associated with the remote position feedback sensor, such as a quad position detector, used to detect positioning accuracy between two optical wireless link (OWL) units. The incoming beam transmitted from the remote OWL is first polarized, and then a single detector, which may be the data detector as well as the position detector, is employed to detect the polarization at the receiver. The single detector eliminates the non-linearity associated with a quad position detector, since the space between the quad detectors is eliminated.

In one aspect of the invention, a technique that eliminates the non-linearities associated with the remote feedback sensor used in a micro-electro-mechanical (MEM) mirror assembly is implemented to improve the SNR associated with the remote feedback sensor.

According to one embodiment, a method of position demodulation in an optical wireless link (OWL) comprises the steps of polarizing a light beam transmitted from a first OWL; and passing the polarized light beam transmitted from the first OWL through a polarization detector within a second OWL to detect amplitude changes as the beam passes through at least one polarity-detecting filter.

According to another embodiment, a method of position demodulation in an optical wireless link (OWL) comprises the steps of polarizing a light beam transmitted from a first OWL into a desired set of regions such that each region has a polarity angle that is distinct from the polarity angle associated with each other region; and passing the polarized light beam transmitted from the first OWL through a polarization detector within a second OWL to detect amplitude changes associated with each region.

According to yet another embodiment, a position demodulation system for an optical wireless link (OWL) comprises a laser generator; a MEM mirror operational to reflect a light beam emitted by the laser generator; and a polarizing filter positioned between the laser generator and the MEM mirror such that the light beam emitted by the laser generator is polarized into a desired set of regions prior to reflection of the light beam by the MEM mirror.

According to still another embodiment, a position demodulation system for an optical wireless link (OWL) comprises an optical receiver; and a polarization detector, wherein the optical receiver is operational to detect amplitude changes associated with a polarized light beam transmitted from a remote OWL subsequent to the polarized light beam passing through the polarization detector.

BRIEF DESCRIPTION OF THE DRAWINGS

Other aspects, features and advantages of the present invention will be readily appreciated, as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
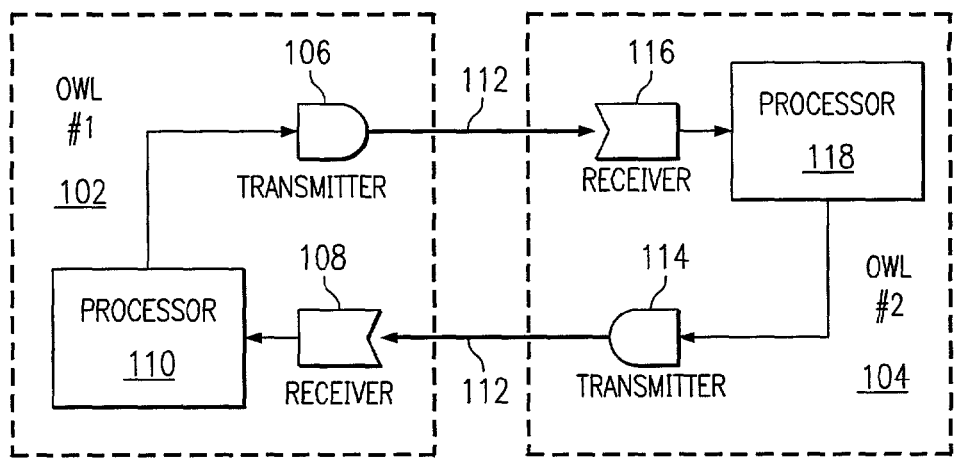
FIG. 1 is a block diagram illustrating a pair of OWLs communicating with one another in which each OWL includes a transmitter, receiver and a processor/controller.

FIG. 1 is a block diagram illustrating an OWL system 100 having a pair of OWLs 102, 104 communicating with one another in which OWLs 102, 104 include respective transmitters 106, 114, receivers 108, 116 and processors 110, 118. Each transmitter 106, 114 is able to change the direction of its transmitted beam by known amounts of angular displacement. The receivers 108, 116 see this motion as a linear displacement, and send position correction information back to the remote station via its respective transmitter 106, 114. This feedback is used by a servo control loop algorithm to position the transmitted beam on the respective receiver 108, 116 of the remote station.

Figure 2:
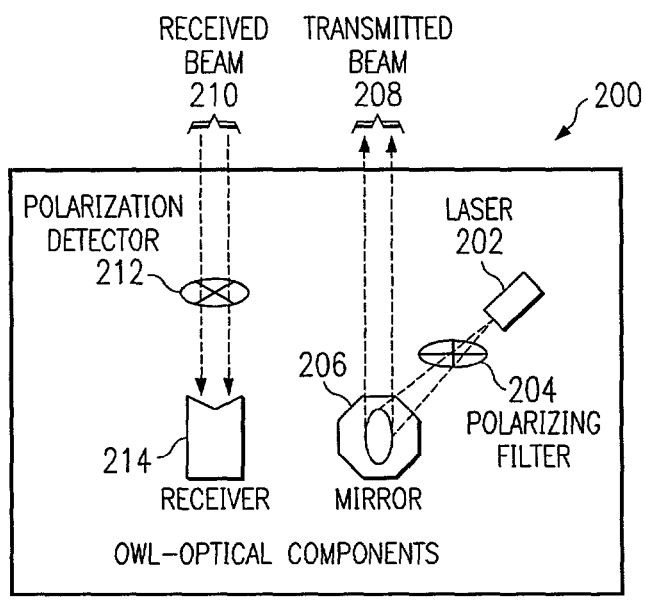
FIG. 2 is a system block diagram illustrating optical components within an OWL according to one embodiment of the present invention and that is suitable for use with the OWLs shown in FIG. 1.
Figure 3:
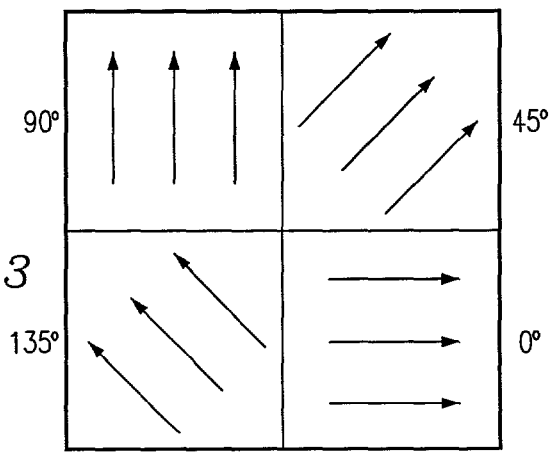
FIG. 3 is a pictorial diagram illustrating polarization of a transmitted light beam into four quadrants in which each quadrant is polarized at forty-five degree angles, such that opposite corners are orthogonal.

FIG. 2 is a system level diagram illustrating optical components within an OWL 200 according to one embodiment of the present invention. In addition to the standard components discussed herein before with reference to FIG. 1, OWL 200 can be seen to also include a polarizing filter 204 as well as a polarization detector 212. Polarizing filter 204 is placed between the laser 202 and the MEM mirror 206 such that the transmitted beam 208 is positioned to pass through the center of the polarizing filter 204 that has the property of polarizing each quadrant in a different direction. According to one embodiment, each quadrant is polarized at forty-five degree angles, such that opposite corners will be orthogonal as illustrated in FIG. 3. During data transmission, polarizing filter 204 generally will have no adverse effects on the transmitted beam 208. If polarizing filter 204 adversely affected the signal strength, the power could simply be increased to compensate, since polarizing filter 204 is internal to the transmitter unit. The present invention is not so limited however, and it shall be understood that many types of polarizing filters can be implemented in a wide variety of ways to accomplish polarization of the transmitted beam 208. In one alternative embodiment, the polarizing filter would include a temporal property as well, changing the polarization of the transmitted beam 208 in a defined sequence. Those skilled in the art will appreciate that modulating the polarization in any manner falls within the scope and spirit of the principles of this invention.

Position detection is implemented on the receiving end using a data detector within receiver 214 to detect amplitude changes as the received beam 210 passes through a ferro-electric polarity-detecting filter 212. The present invention is not so limited however, and it shall be understood that any combination and/or type of polarization detectors 212 may be implemented in a fashion that achieves position demodulation through polarization of the transmitted beam. An array of two or four polarity-detecting filters 212, or filters having a temporal dependence for example, may be required to perform this function in a particular embodiment.

It can be appreciated that if polarity-detecting filter 212 operates in an ON/OFF fashion, four such filters 212 oriented similar to the transmitted beam quadrants would be required. During a "servo frame" (a time slice reserved for position decode), each filter 212 would then be turned-on for a brief period to detect how much effect each quadrant was having on the overall amplitude. The resultant information can then be used to determine how the received beam 210 is centered relative to the receiver 214 data detector.

It can also be appreciated that if each polarity-detecting filter 212 is capable of operating to only slightly block light via its respective polarization, then the filter(s) 212 need not be confined to operation only during a "servo frame", but can then be cycled continuously to provide a potentially improved position value.

If each polarity-detecting filter 212 operates to pass light in either one of two orthogonal axes, then two such filters 212 would be required—one to detect between 0 and 90 degrees, and the other to detect between 45 and 135 degrees.

Those skilled in the art will appreciate that polarity-detecting filter 212 may have a negative impact on the SNR of the data if there is no way to turn-off the filtering. Further, some known polarity detectors have the ability to change the angle of polarity based on an input voltage level. It may therefore suffice to use a single detector of this type if there is a method of either turning the polarity detector off (allowing full transmission during the data frame), or allowing only partial filtering allowing the polarity detector to cycle through its polarity fields without regard to servo/data frame.

In view of the above, it can be seen the present invention presents a significant advancement in the art of optical wireless communication techniques. Further, this invention has been described in considerable detail in order to provide those skilled in the optical wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of position demodulation in an optical wireless link (OWL), the method comprising the steps of:
    polarizing a light beam transmitted from a first OWL; and
    passing the polarized light beam transmitted from the first OWL through a polarization detector within a second OWL to detect amplitude changes as the beam passes through at least one polarity-detecting filter
    wherein the step of polarizing a light beam transmitted from a first OWL comprises polarizing a light beam into a desired set of regions such that each region has a polarity that is distinct from the polarity associated with each other region, and wherein the step of passing the polarized light beam transmitted from the first OWL through a polarization detector within a second OWL to detect amplitude changes as the beam passes through at least one polarity-detecting filter comprises passing the polarized light beam transmitted from the first OWL through a single variable polarity detecting filter that operates in response to an input voltage level to change its angle of polarity such that data corresponding to each region within the desired set of regions is demodulated in response to amplitude changes.

2. The method according to claim 1 further comprising the step of demodulating position data in response to the amplitude changes.

3. The method according to claim 1 wherein the step of passing the polarized light beam transmitted from the first OWL through a polarization detector within a second OWL to detect amplitude changes as the beam passes through at least one polarity-detecting filter comprises passing the polarized light beam transmitted from the first OWL through a plurality of polarity detecting filters such that each region within the desired set of regions has a distinct polarity detecting filter associated therewith.

4. The method according to claim 1 wherein the step of polarizing a light beam transmitted from a first OWL comprises changing the polarization of the transmitted beam in a defined sequence.

5. The method according to claim 1 wherein the step of polarizing a light beam transmitted from a first OWL comprises modulating the polarization of the transmitted beam to achieve a desired temporal property.

6. The method according to claim 1 wherein the step of passing the polarized light beam transmitted from the first OWL through a polarization detector within a second OWL to detect amplitude changes as the beam passes through at least one polarity-detecting filter comprises passing the polarized light beam transmitted from the first OWL through a polarization detector to detect polarization of the transmitted beam in a defined sequence.

7. The method according to claim 1 wherein the step of passing the polarized light beam transmitted from the first OWL through a polarization detector within a second OWL to detect amplitude changes as the beam passes through at least one polarity-detecting filter comprises passing the polarized light beam transmitted from the first OWL through a polarization detector such that polarization of the transmitted beam is demodulated according to a desired temporal property.

8. A method of position demodulation in an optical wireless link (OWL), the method comprising the steps of:
   polarizing a light beam transmitted from a first OWL into a desired set of regions such that each region has a polarity angle that is distinct from the polarity angle associated with each other region; and
   passing the polarized light beam transmitted from the first OWL through a polarization detector within a second OWL to detect amplitude changes associated with each region; wherein the step of polarizing a light beam transmitted from a first OWL into a desired set of regions comprises polarizing the light beam transmitted from a first OWL into at least one quadrant such that opposite corners of the at least one quadrant are orthogonal to one another.

9. The method according to claim 8 further comprising the step of demodulating position data corresponding to each region in response to the amplitude changes.

10. The method according to claim 8 wherein the step of polarizing a light beam transmitted from a first OWL into a desired set of regions comprises passing the light beam through the center of a polarizing filter to polarize each region of the light beam in a different direction.

11. The method according to claim 10 wherein the step of polarizing a light beam transmitted from a first OWL into a desired set of regions further comprises passing the light beam through the center of a polarizing filter to polarize each quadrant of the light beam in a different direction.

12. The method according to claim 11 wherein the step of polarizing a light beam transmitted from a first OWL into a desired set of regions further comprises polarizing each quadrant of the light beam such that opposite corners will be orthogonal to one another.

13. A position demodulation system for an optical wireless link (OWL) comprising:
   a laser generator;
   a MEM mirror operational to reflect a light beam emitted by the laser generator; and
   a polarizing filter positioned between the laser generator and the MEM mirror such that the light beam emitted by the laser generator is polarized into a desired set of regions prior to reflection of the light beam by the MEM mirror and wherein the polarizing filter is further operational to polarize each quadrant of the light beam emitted by the laser generator in a different direction.

14. The position demodulation system according to claim 13 further comprising:
   an optical receiver; and
   a polarization detector, wherein the optical receiver is operational to detect amplitude changes associated with a polarized light beam transmitted from a remote OWL subsequent to the polarized light beam passing through the polarization detector.

15. The position demodulation system according to claim 14 wherein the optical receiver and polarization detector are further operational to achieve position demodulation in response to the amplitude changes.

16. A position demodulation system for an optical wireless link (OWL) comprising:
   an optical receiver; and
   a polarization detector, wherein the optical receiver is operational to detect amplitude changes associated with a polarized light beam transmitted from a remote OWL subsequent to the polarized light beam passing through the polarization detector;
   a laser generator;
   a MEM mirror operational to reflect a light beam emitted by the laser generator; and
   a polarizing filter positioned between the laser generator and the MEM mirror such that the light beam emitted by the laser generator is polarized into a desired set of regions prior to reflection of the light beam by the MEM mirror;
   wherein the polarizing filter is configured to polarize each quadrant of the light beam emitted by the laser generator in a different direction, and wherein the polarizing filter is further configured to polarize each quadrant of the light beam emitted by the laser generator such that opposite corners will be orthogonal to one another.

17. The position demodulation system according to claim 16 wherein the optical receiver and polarization detector are further operational to achieve position demodulation in response to the amplitude changes.

* * * * *